United States Patent Office 3,641,026
Patented Feb. 8, 1972

3,641,026
PHTHALAZINE DERIVATIVES
Harm Jan Panneman, Vijversingel, Netherlands, assignor to Organon Inc., West Orange, N.J.
No Drawing. Filed June 9, 1969, Ser. No. 831,715
Claims priority, application Netherlands, July 23, 1968, 6810452
Int. Cl. C07d 51/06
U.S. Cl. 260—250          4 Claims

ABSTRACT OF THE DISCLOSURE

Novel 1,2,3,4-tetrahydro-phthalazine-2-carboxamidines of the general formula:

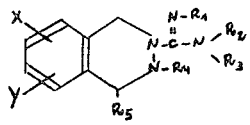

in which $R_1$, $R_2$, $R_3$, $R_4$ being H or a $C_{1-4}$ alkylgroup, $R_5$ is H, lower alkyl, aryl, aralkyl and X and Y are H, OH, SH, lower alkyl or alkoxy, Hl, $NH_2$, $CF_3$, sulfamyl and acid addition salts of these compounds. They can be prepared from

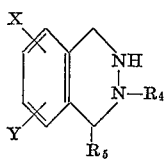

by appropriate substitution of the hydrogen carrying nitrogen atom.

---

The invention relates to novel 1,2,3,4-tetrahydrophthalazine-2-carboxamidines of the general formula:

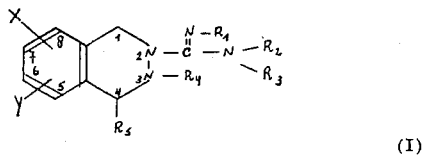

(I)

in which $R_1$, $R_2$, $R_3$ and $R_4$ represent hydrogen or an alkyl group with 1–4 carbon atoms, $R_5$ hydrogen, a lower alkyl, aryl or aralkyl, and X and Y hydrogen, hydroxyl, mercapto, a lower alkyl, a lower alkoxy, halogen, amino, trifluoromethyl or a sulfamyl group and their acid addition salts with therapeutically acceptable inorganic or organic acids, and their preparation.

By "lower" alkyl is meant a straight or branched hydrocarbon radical with 1–6 carbon atoms, such as methyl, ethyl, propyl, isopropyl, normal secondary and tertiary butyl and amyl.

The compounds according to the invention form an entirely new group of substances having an especially strong antihypertensive activity.

The invention encompasses the preparation of new tetrahydrophthalazine - 2 - carboxamidines starting from compounds of the formula:

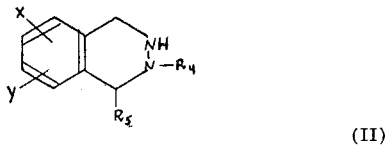

(II)

in which X, Y, $R_4$ and $R_5$ have the meaning indicated above, in a manner known for similar compounds, and also to the preparation of therapeutical preparations containing one or more of these compounds, or their acid addition salt, as active components, and also to the products prepared therefrom, such as tablets, coated tablets, grains and suppositories.

The compounds according to the present invention have valuable hypotensive properties on administration in the normalisation of an undesired high blood pressure in case of renal, neurogenic or essential hypertension. The effects found seem to be due to the fact that neurotransmitters at the ends of postganglionary sympathetic nerves are prevented from being released. A special advantage of the compounds according to the invention is that on oral administration in case of the said indications they do not cause any orthostatic hypotension at all, unlike other compounds used for the same purpose.

The compounds according to Formula I have a basic character and are preferably used in the form of salts with pharmaceutically acceptable inorganic acids such as hydrochloric acid, hydrobromic and hydroiodic acids, sulphuric acids, phosphoric acids and nitric acid, and with organic acids such as acetic acid, propionic acid, glycollic acid, maleic acid, malonic acid, succinic acid, tartaric acid, lactic acid, citric acid, ascorbic acid, salicylic acid, benzoic acid, phenyl acetic acid, paratoluene sulphonic acid, methane sulphonic acid, and ethane sulphonic acid.

The phthalazines according to the invention can be prepared in the following manners:

(a) The starting product tetrahydro - phthalazine according to Formula II and preferably an acid addition salt thereof is reacted with a cyanamide of the formula:

(III)

in which $R_2$ and $R_3$ have the meaning indicated above. It is preferable to perform the reaction by heating at boiling temperature in an inert solvent such as benzene, toluene and xylene for 2 to 36 hours.

(b) The preferred reagent for the introduction of an unsubstituted carboxamidine group is S-lower alkyl-isothiourea, especially S-methyl-isothiourea and the acid addition salts thereof, such as the sulphate. The reaction thereof with the acid addition salts of the compounds according to Formula II is preferably performed in water or in water-miscible solvents, such as lower aliphatic alcohols, for example methanol and ethanol and in aqueous mixtures thereof, in the presence of a quantity of base, such as sodium hydroxide and sodium ethanolate, equivalent to the quantity of acid addition salt applied. The duration of reaction, for example from 2 to 96 hours, depends on the temperature, which may vary between 20° C. and the boiling point of the solvent. Analogously it is also possible to apply for the same purpose O-alkyl-isourea compounds of the formula:

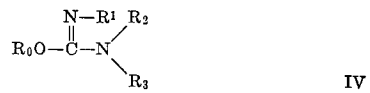

IV in which $R_1$, $R_2$ and $R_3$ have the meaning indicated above and $R_0$ represents a lower alkyl group, or their addition salts. In this case the O-methyl-isourea-hydrosulphate is preferred as the reagent.

(c) The present compounds can also be prepared with 2-lower alkyl-1-nitro-isothiourea and 2-lower alkyl-1-nitroisourea as reagents, especially the 2-methyl compounds. In this manner nitroguanidine compounds are obtained. The nitroguanylation reaction with these reagents is preferably performed in water or in water-miscible solvents such as lower aliphatic alcohols. If an acid addition salt of a compound of Formula II is applied, an equivalent quantity of a base, for example sodium hydroxide or sodium ethanolate, is added as well. The reaction mixture is heated for, for example about 2-24 hours at a temperature of from 20° C. to the boiling point of the solvent. The conversion of the resulting nitroguanidines into the final products according to Formula I is preferably performed by reduction with hydrogen in the presence of a suitable catalyst such as 10% palladium on carbon in an organic solvent, preferably glacial acetic acid. In this case the guanidine compound is obtained as acetic acid salt.

(d) An indirect method of preparation consists in the reaction of compounds of Formula II with thiocyanic acid or an alkyl-isothiocyanate of formula $R_1NCS$ in the conventional manner to obtain substituted or non-substituted thiourea compounds. By alkylation with an alkyl halide, preferably methyliodide, these compounds can be converted into S-alkyl-isothiouronium salts, which can be converted into the desired final products by reacting them with an amine of the formula:

The latter reaction is preferably performed in water or water-miscible solvents, such as lower aliphatic alcohols, or in aqueous solutions thereof, at room temperature.

The new tetrahydro - phthalazine - carboxamide compounds are mostly obtained as a salt. From the salt the free base can be prepared in a conventional manner, for example by conversion with a strong base, such as an alkali metal hydroxide solution in water, or an alkali metal alkanolate in an inert organic solvent, or by means of ion exchangers. The base formed can be extracted from the mixture with a water immiscible, preferably volatile, organic solvent. Conversely acid addition salts can be prepared from the free base by neutralisation with the desired acid in a suitable solvent, such as lower aliphatic alcohol, an ether, ester or a mixture of solvents.

The acid addition salts of the present carboxamidines, which are outstanding for their solubility in water, can be applied for example in the form of a pharmaceutical preparation. For this purpose they are brought in a form suitable for enteral, parenteral or rectal administration, for example in the form of tablets, coated tablets, pills, suppositories, grains, powders, capsules, or in a liquid form as solutions, suspensions and emulsions. If desired, these preparations can be sterilised and they can contain auxiliaries, such as flavourings and colouring matter, preservatives, stabilizers, wetting agents, emulsifying agents or solubilizers and also buffers or agents for adjusting the osmotic pressure. Suitable substances are carriers which do not react with the active substances, such as gelatin, lactose, starch, talcum, magnesium stearate and gums, vegetable oils and polyalkylene-glycols. Injectable preparations should preferably contain sterile, pyrogen-free water or oil as a carrier.

The preparations containing one or more of the compounds according to the invention may contain 10 to 1000 mg. active substance per dosage unit. They may contain 5 to 100% of the active substance dependent upon the way of administration.

Substances showing a good antihypertensive activity are 1,2,3,4-tetrahydro-phthalazine-2-carboxamidine,
N,N'-dimethyl-1,2,3,4-tetrahydro-phthalazine-2-carboxamidine,
3-methyl-1,2,3,4-tetrahydrophthalazine-2-carboxamidine and
N-methyl-1,2,3,4-tetrahydro-phthalazine-2-carboxamidine and
N,N-dimethyl-1,2,3,4-tetrahydro-phthalazine-2-carboxamidine.

Other valuable compounds of this group are:

6-chloro-7-sulfamyl-1,2,3,4-tetrahydro-phthalazine-2-carboxamidine
6-chloro-1,2,3,4-tetrahydro-phthalazine-2-carboxamidine
7-chloro-6-sulfamyl-1,2,3,4-tetrahydro-phthalazine-2-carboxamidine
N,N'-dimethyl-6-trifluoromethyl-1,2,3,4-tetrahydro-phthalazine-2-carboxamidine
N-methyl-7-hydroxy-1,2,3,4-tetrahydro-phthalazine-2-carboxamidine
4-methyl-1,2,3,4-tetrahydro-phthalazine-2-carboxamidine
4-phenyl-1,2,3,4-tetrahydro-phthalazine-2-carboxamidine
N-ethyl-1,2,3,4-tetrahydro-phthalazine-2-carboxamidine
N-methyl-5-hydroxy-1,2,3,4-tetrahydro-phthalazine-2-carboxamidine
N,N'-dimethyl-8-hydroxy-1,2,3,4-tetrahydro-phthalazine-2-carboxamidine
8-chloro-1,2,3,4-tetrahydro-phthalazine-2-carboxamidine
7-methoxy-8-chloro-1,2,3,4-tetrahydro-phthalazine-2-carboxamidine
5-bromo-1,2,3,4-tetrahydro-phthalazine-2-carboxamidine
6,7-dimethyl-1,2,3,4-tetrahydro-phthalazine-2-carboxamidine
N-methyl-6-amino-1,2,3,4-tetrahydro-phthalazine-2-carboxamidine and
6-mercapto-1,2,3,4-tetrahydro-phthalazine-2-carboxamidine.

It will be understood that the compounds with a substituent in the 4-position can be used as racemate or in an optically active form.

The invention is illustrated in detail by the following examples which are not to be regarded as limiting, however.

EXAMPLE IA 1,2,3,4-tetrahydro-phthalazine-2-carboxamidine-hydrochloride-monohydrate A mixture of 0.85 gm. 1,2,3,4-tetrahydro-phthalazine-hydrochloride (J. Am. Chem. Soc. 85, 2144 (1963)) and 1.39 gm. S-methylisothiourea sulphate in 2.5 ml. 2 N NaOH was stirred for 96 hours at room temperature. The precipitate formed was filtered off and dried after having been washed with water. After recrystallisation from water 0.40 gm. 1,2,3,4-tetrahydro-phthalazine-2-carboxamidine-hydrochloride-monohydrate were obtained. Melting point: 206–208° C.

Analysis.—Calculated for $C_9H_{12}N_4 \cdot HCl \cdot H_2O$ (percent): C, 46.86; H, 6.56; N, 24.28; Cl, 15.36. Found (percent): C, 46.6; H, 6.6; N, 24.3; Cl, 15.7.

EXAMPLE IB 1,2,3,4-tetrahydro-phthalazine-2-carboxamidine acetate (a) N-nittro - 1,2,3,4 - tetrahydro-phthalazine - 2 - carboxamide.—A mixture of 29.9 gm. 1,2,3,4-tetrahydro-phthalazine-hydrochloride and 23.6 gm. 2-methyl-1-nitro-isothiourea in 175 ml. 1 N NaOH was stirred for 24 hours at room temperature. The precipitate formed was filtered off and dried after having been washed with water. After recrystallisation from ethanol 33.40 gm. N-nitro-1,2,3,4-tetrahydro - phthalazine-2-carboxamidine was obtained. Melting point: 170–171° C.

Analysis.—Calculated for $C_9H_{11}N_5O_2$ (percent): C, 48.86; H, 5.01; N, 31.66; O, 14.46. Found (percent): C, 49.1; H, 5.2; N, 31.6; O, 14.6.

(b) 1,2,3,4-tetrahydro-phthalazine - 2 - carboxamidine acetate.—28.40 gm. N-nitro-1,2,3,4-tetrahydro - phthalazine-2-carboxamidine was suspended in 650 ml. glacial acetic acid. To this suspension was added 1 gm. 10% palladium on carbon, after which nitrogen was bubbled through for 22 hours. Then the catalyst was filtered off and the filtrate evaporated to dryness in vacuo. The residue was crystallised from ethanol to obtain 24.50 gm. 1,2,3,4 - tetrahydro-phthalazine-2-carboxamidine acetate. Melting point: 237–238° C.

Analysis.—Calculated for $C_9H_{12}N_4 \cdot CH_3COOH$ (percent): C, 55.92; H, 6.83; N, 23.72; O, 13.54. Found (percent): C, 56.2; H, 7.0; N, 23.4; O, 13.9.

The above-mentioned acetate was converted into the hydrochloride monohydrate described in Example IA by treating an aqueous solution of the acetate with 4 N hydrochloric acid, during which treatment the hydrochloric monohydrate precipitates. A mixed melting point of this hydrochloride monohydrate with the product described in Example IA gave no depression. By rendering an aqueous solution of the acetate alkaline with sodium or potassium hydroxide the free base 1,2,3,4-tetrahydro-phthalazine-2-carboxamidine is obtained, from which acid addition salts can be prepared in the conventional manner by treatment with the desired acids.

EXAMPLE IC 1,2,3,4-tetrahydro-phthalazine-2-carboxamidine-hydrochloride-monohydrate A suspension of 1.71 gm. tetrahydro-phthalazine-hydrochloride and 0.40 gm. cyanamide in 10 ml. toluene was refluxed for 6 hours. After cooling down of the reaction mixture the precipitate was filtered off and dried after having been washed with water. After recrystallisation from water 0.90 gm. 1,2,3,4-tetrahydro-phthalazine-2-carboxamidine-hydrochloride-monohydrate was obtained. Melting point: 206–208° C. A mixed melting point with the product described in Example IA gave no depression.

EXAMPLE ID 1,2,3,4-tetrahydro-phthalazine-2-carboxamidine-hydrochloride-monohydrate (a) 1,2,3,4-tetrahydro-phthalazine-2-carbothioamide.— A mixture of 12.8 gm. 1,2,3,4-tetrahydro-phthalazine-hydrochloride and the 5.7 gm. ammonium rhodanide in 300 ml. dry toluene was refluxed for 24 hours. After cooling down of the reaction mixture the precipitate formed was filtered off and dried after having been washed with water. After recrystallisation from aqueous n-butanol 12.00 gm. 1,2,3,4-tetrahydro-phthalazine-2-carbothioamide was obtained. Melting point: 191–192° C.

Analysis.—Calculated for $C_9H_{11}N_3S$ (percent): C, 55.93; H, 5.73; N, 21.75; S, 16.59. Found (percent): C, 56.3; H, 6.0; N, 21.2; S, 16.6.

(b) S - methyl-1,2,3,4-tetrahydro-phthalazine-2-carbothio-imidate-hydrochloride.—10.4 gm. 1,2,3,4-tetrahydro-phthalazine-2-carbothioamide was suspeneded in 75 ml. ethanol. Then 3.4 ml. methyliodide was added, after which the reaction mixture was refluxed for 2 hours. Then the mixture was evaporated in vacuo to a small volume, after which the reaction product was crystallized by adding ether. After recrystallisation from ethanol-ether 17.2 gm. S-methyl-1,2,3,4-tetrahydro-phthalazine - 2 - carbothio-imidate hydroiodide was obtained. Melting point: 177–178° C.

Analysis.—Calculated for $C_{10}H_{13}N_3S \cdot HI$ (percent): C, 35.83; H, 4.21; N, 12.54; S, 9.56; I, 37.86. Found (percent): C, 36.0; H, 4.3; N, 12.4; S, 9.2; I, 38.5.

The hydroiodide was dissolved in water, after which the pH of the solution was adjusted to 8 with potassium carbonate. The precipitate of the free base was filtered off and dried after having been washed with water. Then 1 equivalent HCl in ether was added to a solution of the said free base in methanol and the precipitate filtered off. After recrystallisation of the product from ethanol-ether 10.96 gm. S-methyl-1,2,3,4-tetrahydro-phthalazine-2-carbothio-imidate-hydrochloride was obtained. Melting point: 214–215° C.

(c) 1,2,3,4 - tetrahydro - phthalazine-2-carboxamidine-hydrochloride-monohydrate.—To a suspension of 1.21 gm. S-methyl-1,2,3,4-tetrahydro-phthalazine-2-carbothio-imidate-hydrochloride in 2.5 ml. ethanol was added 3 ml. of a solution of 4 N ammonia in ethanol. The reaction mixture was stirred for 48 hours at room temperature and then evaporated to dryness in vacuo. The residue was crystallised from water to obtain 0.66 gm. 1,2,3,4-tetrahydro - phthalazine - 2-carboxamidine-hydrochloride-monohydrate. Melting point: 206° C. A mixed melting point of the above-mentioned substance with the products described in Examples IA and IC gave no depression.

EXAMPLE II

N-methyl-1,2,3,4-tetrahydro-phthalazine-2-carboxamidine-hydrochloride

To a suspension of 2.4 gm. S-methyl-1,2,3,4-tetrahydro-phthalazine-2-carbothio-imidate-hydrochloride in 5 ml. ethanol was added 2.2 ml. of a solution of 9 N methylamine in ethanol. The reaction mixture was stirred for 48 hours at room temperature and then evaporated to dryness in vacuo. The residue was crystallised from ethanol-ether to obtain 1.44 gm. N-methyl-1,2,3,4-tetrahydro-phthalazine - 2 - carboxamidine - hydrochloride. Melting point: 232–233° C.

Analysis.—Calculated for $C_{10}H_{14}N_4 \cdot HCl$ (percent): C, 52.97; H, 6.67; N, 24.71; Cl, 15.64. Found (percent): C, 52.5; H, 6.9; N, 24.2; Cl, 15.7.

By rendering an aqueous solution of the hydrochloride alkaline with sodium- or potassium hydroxide the free base N - methyl-1,2,3,4-tetrahydro-phthalazine-2-carboxamidine is obtained, from which acid addition salts can be prepared in the conventional manner.

EXAMPLE III

N,N-dimethyl-1,2,3,4-tetrahydro-phthalazine-2-carboxamidine-hydrochloride

This substance was obtained with the process described in Example II using dimethylamine as the reaction component instead of methylamine, N,N-dimethyl-1,2,3,4-tetrahydro - phthalazine-2-carboxamidine-hydrochloride was obtained as a white crystalline substance with a melting point of 220° C.

EXAMPLE IV

N,N'-dimethyl-1,2,3,4-tetrahydro-phthalazine-2-carboxamidine-hemihydrate (a) N - methyl-1,2,3,4-tetrahydro-phthalazine-2-carbothioamide.—15.30 gm. 1,2,3,4-tetrahydro-phthalazine-hydrochloride was suspended in 90 ml. of a solution of 1 N sodium ethanolate in ethanol. Then a solution of 6.60 gm. methylisothiocyanate in 50 ml. ethanol was added dropwise, after which the reaction mixture was stirred for 3 hours at room temperature and next poured into 250 ml. water. The resulting precipitate was filtered off and dried after having been washed with water. After recrystallisation from aqueous n-butanol 14.10 gm. N-methyl-1,2,3,4-tetrahydo-phthlazine-2-carbothioamide was obtained. Melting point: 226–227° C.

Analysis.—Calculated for $C_{10}H_{13}N_3S$ (percent): C, 57.94; H, 6.32; N, 20.27; S, 15.47. Found (percent): C, 58.1; H, 6.5; N, 20.3; S, 15.2.

(b) N,S - dimethyl - 1,2,3,4-tetrahydro-phthalazine-2-carbothio-imidate-hydrochloride.—A mixture of 22.80 gm. N-methyl-1,2,3,4-tetrahydro-phthalazine-2-carbothioamide and 10.6 ml. methyliodide in 165 ml. ethanol was refluxed for 3 hours. After cooling down of the reaction mixture the resulting precipitate of the N,S-dimethyl-1,2,3,4 - tetrahydro-phthalazine-2-carbothio-imidate-hydro-iodide was filtered off, washed with ether and dried (36.90 gm., melting point: 140–143° C.). This HI salt was dissolved in water, after which an excess of a solution of 10% sodium bicarbonate was added. The precipitate of the free base formed was filtered off washed with ice-water and dried. The relatively unstable, free base was immediately converted into the corresponding hydrochloride by dissolving it in the minimum quantity of ethanol, after which an equivalent quantity of HCl in ether was added. The resulting precipitate was filtered off, washed with ether and dried. After recrystallisation from ethanol-ether 22.8 gms. N,S-dimethyl-1,2,3,4-tetrahydro-phthalazine-2-carbothio-imidate-hydrochloride was obtained. Melting point: 154–155° C.

Analysis.—Calculated for $C_{11}H_{15}N_3S \cdot HCl$ (percent):

C, 51.25; H, 6.26; N, 16.30; S, 12.44; Cl, 13.75. Found (percent): C, 51.4; H, 6.4; N, 15.9; S, 12.2; Cl, 14.1.

(c) N,N' - dimethyl-1,2,3,4-tetrahydro-phthalazine-2-carboxamidine-hydrochloride-hemihydrate.—To a suspension of 22.80 gm. N,S-dimethyl-1,2,3,4-tetrahydro-phthalazine-2-carbothio-imidate-hydrochloride in 45 ml. ethanol was added 19.6 ml. of a solution of 9 N methylamine in ethanol. Then the reaction mixture was stirred for 24 hours at room temperature. Then 100 ml. ether was added to the cooled reaction mixture, after which the precipitate formed was filtered off washed with water and dried. Obtained after recrysallisation from ethanol-ether: 16.70 gm. N,N'-dimethyl-1,2,3,4-tetrahydro-phthalazine-2-caramidine-hydrochloride-hemihydrate. Melting point: 145–147° C.

*Analysis.*—Calculated for $C_{11}H_{16}N_4 \cdot HCl \cdot \tfrac{1}{2}H_2O$ (percent): N, 22.43; Cl, 14.19. Found (percent): N, 22.2; Cl, 14.0.

Calculated $H_2O$ content: 3.61%. Found (Karl-Fischer): 3.88%. The hydrochloride described above was converted into the corresponding sulphate by dissolving the hydrochloride in 1.0 N NaOH, extracting the free base formed with ether and adding to the ether extract an equivalent quantity of 0.5 N $H_2SO_4$ in ether. The resulting N,N' - dimethyl-1,2,3,4-tetrahydro-phthalazine-2-carboxamidine-sulphate melts at 168–169° C. Other desired acid addition salts can be prepared from the free base in the same manner.

EXAMPLE V 3-methyl-1,2,3,4-tetrahydro-phthalazine-2-carboxamidine-hydrochloride (a) 3 - benzyloxycarbonyl - 1,2,3,4 - tetrahydro-phthalazine.—27.2 gm. 1,2,3,4-tetrahydro-phthalazine-hydrochloride was dissolved in a mixture of 160 ml. benzene and 160 ml. 2 N NaOH cooled down to +8° C., after which 27.3 gm. benzyloxycarbonyl-chloride was added dropwise while stirring vigorously. Then the reaction mixture was stirred for 1 hour at +8° C., after which the benzene layer was separated, washed with water and dried over sodium sulphate. Then the benzene extract was evaporated to dryness in vacuo, after which the residue was crystallised from ethyl acetate-petroleumether to obtain 32.6 gm. 3 - benzyloxycarbonyl - 1,2,3,4 - tetrahydro-phthalazine. Melting point: 90–91° C.

(b) 3 - methyl - 1,2,3,4-tetrahydro-phthalazine-hydrochloride.—1.43 gm. $LiAlH_4$ was suspended in 50 ml. of dry ether, after which a solution of 6.3 gm. 3-benzyloxycarbonyl-1,2,3,4-tetrahydro-phthalazine in 20 ml. of dry ether was added dropwise, while stirring. Then the reaction mixture was refluxed for 1 hour, after which it was cooled down to +5° C. Then 6 ml. water was added dropwise. The resulting precipitate was filtered off, after which 5 ml. of a 5 N HCl solution in ethanol was added to the filtrate. The precipitate formed was filtered off and crystallised from ethanol-ether to obtain 2.74 gm. 3-methyl-1,2,3,4-tetrahydro-phthalazine-hydrochloride. Melting point: 160–161° C.

*Analysis.*—Calculated for $C_9H_{12}N_2 \cdot HCl$ (percent): C, 58.53; H, 7.10; N, 15.17; Cl, 19.20. Found (percent): C, 58.6; H, 7.1; N, 15.2; Cl, 19.1.

(c) 3 - methyl - 1,2,3,4 - tetrahydro-phthalazine-2-carboxamidine-hydrochloride.—A suspension of 1.84 gm. 3-methyl - 1,2,3,4 - tetrahydro-phthalazine-hydrochloride and 0.4 gm. cyanamide in 10 ml. toluene was refluxed for 6 hours. Then the reaction mixture was cooled down, after which the precipitate was filtered off, washed with ether and dried. After 2 crystallisations from ethanol-ether 1.20 gm. 3-methyl-1,2,3,4-tetrahydro-phthalazine-2-carboxamidine-hydrochloride was obtained. Melting point: 191–192° C.

*Analysis.*—Calculated for $C_{10}H_{14}N_4 \cdot HCl$ (percent): C, 52.97; H, 6.67; N, 24.71; Cl, 15.64. Found (percent): C, 52.1; H, 7.1; N, 24.3; Cl, 15.4.

EXAMPLE VI 4-phenyl-1,2,3,4-tetrahydro-phthalazine-2-carboxamidine-acetate (a) N - nitro - 4 - phenyl - 1,2,3,4 - tetrahydro-phthalazine-2-carboxamidine.—To a suspension of 1 gm. 4-phenyl-1,2,3,4-tetrahydro-phthalazine-hydrochloride (Ber. 38, 3918 (1905)) in 14 ml. absolute ethanol was added 36.4 ml. 0.11 M alcoholic caustic soda and 0.54 gm. 2-methyl-1-nitro-isothiourea. Then the reaction mixture was refluxed for 24 hours. After the reaction mixture had been cooled down, sodium chloride was filtered off, after which the filtrate was evaporated to dryness in vacuo. The residue was crystallised from chloroform-petroleumether to obtain 0.36 gm. N - nitro - 4 - phenyl-1,2,3,4-tetrahydro-phthalazine-2-carboxamidine. Melting point :188–190° C.

*Analysis.*—Calculated for $C_{15}H_{15}N_5O_2$ (percent): C, 60.59; H, 5.09; N, 23.56; O, 10.76. Found (percent): C, 60.5; H, 5.1; N, 23.6; O, 10.6.

(b) 4 - phenyl - 1,2,3,4 - tetrahydro-phthalazine-2-carboxamidine-acetate.—One gram N-nitro-4-phenyl-tetrahydro-phthalazine-2-carboxamidine was dissolved in 25 ml. glacial acetic acid. Then 0.25 gm. 10% palladium on carbon was added to the solution, after which hydrogen was bubbled through the mixture for 15 hours. Then the catalyst was filtered off and the filtrate evaporated to dryness in vacuo, after which the residue was crystallised from ethanol-ether to obtain 1.00 gm. 4-phenyl-1,2,3,4-tetrahydro-phthalazine-2-carboxamidine-acetate. Melting point: 237° C.

*Analysis.*—Calculated for $C_{15}H_{16}N_4 \cdot CH_3COOH$ (percent): C, 65.37; H, 6.45; N, 17.94; O, 10.24. Found (percent): C, 65.1; H, 7.0; N, 17.9; O, 10.6.

EXAMPLE VII 4-methyl-1,2,3,4-tetrahydro-phthalazine-2-carboxamidine-acetate

This compound was prepared by the process described in Example VI starting from 4-methyl-1,2,3,4-tetrahydro-phthalazine (Ber. 30, 3030 (1897)) instead of from 4-phenyl-1,2,3,4-tetrahydro-phthalazine. The 4-methyl-1,2,3,4-tetrahydro-phthalazine-2-carboxamidine-acetate was obtained as a white crystalline substance. Melting point: 225° C.

EXAMPLE VIII

Tablets 67.25 kg. lactose was mixed with 1.75 kg. finely powdered amylopectin. Then the mixture was passed into a kneading machine, after which 4 kg. water was added and the mixture kneaded. After that the resulting mass was passed through a hammer mill. The ground mass was dried below 60° C. and sieved. The 69 kg. obtained was mixed in a mixing machine with 10 kg. potato starch. 20 kg. 1,2,3,4 - tetrahydro-phthalazine-2-carboxamidine-acetate. Finally magnesium-stearate was mixed through the mixture. The resulting mass was tableted to 100 mg. tablets having a diameter of 6 mm. and containing 20 mg. active substance.

EXAMPLE IX

Injection preparation

Twenty kilos N,N'-dimethyl-1,2,3,4-tetrahydro-phthalazine-2-carboxamidine-sulphate was dissolved in so much water suitable for injection that a solution of 1000 ltr. was obtaned. This solution was sterilised by means of a Millipore-filter and dispensed in 1 ml. ampoules in sterile conditions. Each ampoule contained 20 mg. active substance.

EXAMPLE X

Suppositories

Twenty kilos 3-methyl-1,2,3,4-tetrahydro-phthalazine-2-carboxamidine-hydrochloride, 1000 kg. gelatin and 1000 kg. glycerol were dissolved in such a quantity of water that a solution of 4000 kg. was obtained. During this process the temperature may not rise above 40° C. The liquid mixture obtained was distributed over suppository moulds which could contain 4 gm. substance. The mass was cooled down and the suppositories obtained, which contained 20 mg. active substance each, packed.

What is claimed is:

1. A compound selected from the group consisting of 1,2,3,4-tetrahydro-phthalazine-2-carboxyamidines of the formula:

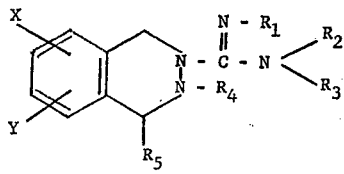

in which $R_1$, $R_2$, $R_3$ and $R_4$ represent a member selected from the group consisting of hydrogen and alkyl with 1–4 carbon atoms, $R_5$ is selected from the group consisting of hydrogen, alkyl with 1–6 carbon atoms and phenyl, and X and Y represent a member selected from the group consisting of hydrogen, hydroxyl, mercapto, alkyl with 1–6 carbon atoms, halogen, amino, trifluoromethyl, and sulfamyl, and the pharmaceutically acceptable acid addition salts thereof.

2. 1,2,3,4-tetrahydro-phthalazine - 2 - carboxamidine-acetate.

3. N,N' - dimethyl - 1,2,3,4 - tetrahydro-phthalazine-2-carboxamidine-sulphate.

4. 3 - methyl - 1,2,3,4 - tetrahydro - phthalazine-2-carboxamidine-hydrochloride.

References Cited
UNITED STATES PATENTS 3,017,411    1/1962    Engelbrecht _____ 260—250

NICHOLAS S. RIZZO, Primary Examiner

U.S. Cl. X.R.

424—250